United States Patent [19]

Durand

[11] 4,040,002
[45] Aug. 2, 1977

[54] WELL DEPTH MATCHER UTILIZING PROGRAMMABLE SHIFTING OF WELL LOGGING DATA

[75] Inventor: Yves Henri Durand, Meudon-Bellevue, France

[73] Assignee: Schlumberger Technology Corporation, New York, N.Y.

[21] Appl. No.: 571,497

[22] Filed: Apr. 25, 1975

Related U.S. Application Data

[63] Continuation of Ser. No. 384,228, July 31, 1973.

[30] Foreign Application Priority Data

Aug. 3, 1972 France .............................. 72.27987

[51] Int. Cl.² .............................................. G01V 1/40
[52] U.S. Cl. ....................... 340/18 DC; 340/15.5 BH; 340/15.5 DP
[58] Field of Search ............. 340/18 DC, 18 R, 172.5, 340/15.5 BH, 15.5 DP, 150, 177 R, 183; 346/33 WL

[56] References Cited

U.S. PATENT DOCUMENTS

| | | | |
|---|---|---|---|
| 3,360,774 | 12/1967 | Smith et al. | 340/18 R |
| 3,388,375 | 6/1968 | Sloughter | 340/18 R |
| 3,405,349 | 10/1968 | Moran | 324/6 |
| 3,434,105 | 3/1969 | Schwartz | 340/18 DC |
| 3,488,661 | 1/1970 | Tanguy | 340/18 DC |
| 3,497,958 | 3/1970 | Gollwitzer | 340/18 DC |
| 3,714,623 | 1/1973 | Mickler | 340/18 DC |
| 3,792,430 | 2/1974 | Niven, Jr. | 340/18 DC |

Primary Examiner—Howard A. Birmiel
Attorney, Agent, or Firm—St. Onge, Mayers, Steward & Reens

[57] ABSTRACT

A method and apparatus for depth shifting well logging data are described. Well logging data signals are converted to digital data words at intervals determined by well depth pulses representing incremental well depths. The digital data words typical for a number of down hole exploring devices are then placed in groups of shift registers for relative shift advancement to outputs where a desired well depth displacement between data words occurs. Shift control words associated with each well logging signal are read from programmable machine readable records to determine the relative shift advance of the digital data words. A recycling counting and comparing process provides for the programmed shift advance of the digital data words to provide desired depth alignment of the well logging data at the shift register outputs.

50 Claims, 3 Drawing Figures

WELL DEPTH MATCHER UTILIZING PROGRAMMABLE SHIFTING OF WELL LOGGING DATA

This is a continuation of application Ser. No. 384,228, filed July 31, 1973.

FIELD OF THE INVENTION

This invention relates to a method and apparatus for the depth shifting of well logging data signals. More specifically, this invention relates to an improved method and apparatus for processing signals for a well logging tool or sonde, to produce well logging data signals having predetermined depth displacement therebetween.

BACKGROUND OF THE INVENTION

Methods and apparatuses for analyzing formations surrounding boreholes and processing resulting well logging data have been extensively described in the art. Note for example the U.S. Pat. No. 3,457,544 to Miller et al. In this patent a system is described wherein a generally cylindrical borehole investigating device provides well logging data from longitudinally distributed sensors which measure various surrounding borehole soil characteristics. The sensors may be electrode arrays and coil arrays for measuring electrical resistivities or conductivities of the subsurface formations, various radioactivity devices for measuring different nuclear phenomena in a borehole, or acoustic measuring devices or any combination of these or other borehole measuring devices.

The longitudinal spacing of the sensors in the borehole investigating device results in a depth-offset (and thus also a time-offset) between the well logging data signals with respect to any one particular borehole depth level.

As described in the above referred to Miller et al patent, the sensor signals are referenced to the depth of the sensors in the borehole with the use of a cable movement sensor. This latter sensor is associated with the cable from which the sonde is suspended in the borehole and generally produces well depth signals representative of cable movement of sufficiently small increments to satisfy depth resolution requirements of the well logging data signals.

Since the longitudinal spacings of the sensors on the borehole investigating device results in a depth-offset between the well logging signals with respect to any one particular borehole region, various techniques have been proposed to restore depth correspondence between the well logging data signals. In one known technique such as described in U.S. Pat. No. 3,714,623 to Mickler, a capacitor variable delay network is used to depth shift analog well logging data signals. Other U.S. patents describing devices and systems for depth matching well logging data signals are U.S. Pat. Nos. 3,405,349 to Moran and 3,434,105 to Schwartz.

Schwartz discloses a system wherein a digital data word is generated representative of an acoustic borehole characteristic over an incremental depth. The digital data words of successive increments are passed in sequence along parallel shift registers to enable borehole analysis by selecting digital data words for any desired borehole segment length. The digital data words are sequenced along their shift registers in synchronization with related intervalometer or well depth signals.

In another known approach for depth shifting of well logging signals, the latter are recorded on a magnetic medium such as a magnetic drum that is moved in synchronization with the movement of the sonde. The recorded signals are then read-out with magnetic heads whose spacings correspond with the spacings of the sonde sensors. The signals from the reading heads at any one instant in time are then representative of the same depth.

Computer processing to provide well depth alignment of well logging data is known. The use of shift registers to advance data at different speeds, or multiplexing of shift lines of shift registers has been done in the art in, for example, the field of telemetering of data.

SUMMARY OF THE INVENTION

In an apparatus and method for depth matching of well logging data in accordance with the invention, well logging data are converted to digital data words at intervals which occur in synchronization with selected recurring well depth signals. The digital data words are then placed at a preselected location in a shift register having a predetermined number of states. The placement of the digital data words in the shift register is selected commensurate with a desired amount of depth shifting. The digital data words are then advanced to the output of the shift register at a shifting speed determined by the recurring well depth signals to provide a desired depth matching at the shift register output.

As described in a preferred embodiment the placement of the well logging digital data words at the desired location in the shift register occurs under control from a shift control word. For a plurality of well logging channels, a shift control word for each channel is used to achieve desired depth matching at shift registers' outputs corresponding to the respective data channels.

As further described in the preferred embodiment, digital data words for a plurality of data channels are placed in groups of parallel shift registers for parallel advancement towards an output. The advance of the digital data words in their respective groups of shift registers occurs under the control of respectively associated shift control words so that the digital data words arrive at the shift register outputs with desired depth correlation.

The shift control words, which may be hard wired, are preferably obtained from a programmable reader which delivers a shift control word for each data channel in synchronization with the analog to digital conversion. The shift control words determine the relative initial advance of the digital data words in their respective shift registers. Thus a controlled displacement of the digital data words is obtained at the shift register outputs for a desired depth relationship of the data in each channel. The depth displaced digital data words may then be processed for well analysis such as by simultaneous recording in a processor. This depth shifting technique can desirably be used to depth correlate or match all measurements derived on the same run of a sonde through the borehole; i.e., all such measurements made at any given time will be referenced to the same depth level even though the sensors which produce each measurement are spaced apart on the sonde.

An advantage of a depth matching apparatus and method in accordance with the invention resides in a versatile selection of the relative depth adjustment of well logging data. For example, if a punched card is employed to determine the shift control words, one may conveniently vary the depth shifting by substituting a new punched card. This is important because different sondes have different sensors spaced apart by different distances.

It is, therefore, an object of the invention to provide an improved and highly versatile well depth shifting apparatus. It is a further object of the invention to provide a programmable method for depth shifting well logging data.

These and other advantages and objects of the invention can be understood from the following detailed description of a method and apparatus for depth shifting well logging information described in conjunction with the drawings wherein FIG. 1 is a schematic block diagram of an apparatus for depth shifting well logging data signals in accordance with the invention;

FIGS. 2A through 2H are each schematic representations of a shift register employed in the apparatus shown in FIG. 1 and illustrate a sequence of operation of the apparatus of FIG. 1; and FIG. 3 is a waveform and timing diagram of selected signal carrying lines in the apparatus of FIG. 1.

DETAILED DESCRIPTION OF EMBODIMENT

Figure 1:
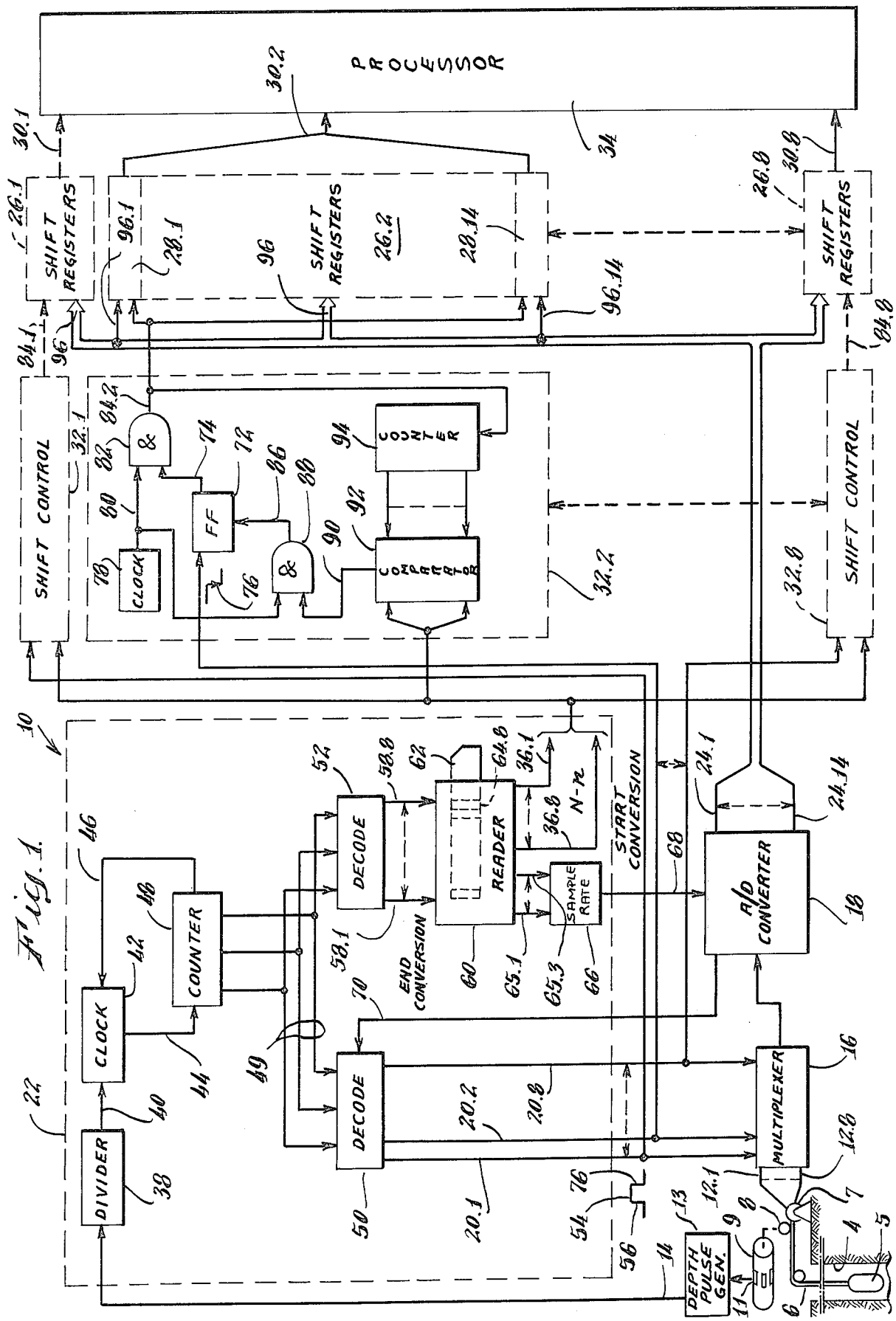

With reference to FIG. 1, a well depth shifting apparatus 10 is shown. A borehole 4 includes a borehole investigating device such as a sonde 5 suspended from a cable 6. Cable 6 is unreeled from a drum and winch mechanism 7 provided with suitable brush and slip ring arrangements to provide electrical connections such as with well logging data lines 12 between the cable 6 and apparatus 10. A drive wheel 8 engages cable 6 so as to rotate in accordance with cable movement. The drive wheel 8 is coupled to rotate a slotted drum 9 having optical slots 11 spaced to produce and direct optical pulses (with a light source, not shown) onto a depth pulse generator 13. The optical pulses into generator 13 are converted to electrical well depth signals applied along line 14 to system 10.

In the embodiment shown in FIG. 1, eight well logging data signals representative of different data channels from a sonde are applied on input lines 12.1 through 12.8. The data signals on lines 12 may be those obtained directly from a sonde (not shown) or from a temporary analog or digital data storage such as a magnetic tape which has recorded the data signals as they are produced by a borehole investigating device. The data signals on lines 12 are, in this example, in the analog state and their relative timing is a function of the location of associated sensors on the sonde. The sensors may be a variety of borehole investigating devices such as disclosed in the previously identified prior art.

Another input signal to apparatus 10 is a well depth signal on input line 14 and obtained from a well depth pulse generator 13 and such as described in the U.S. Pat. No. 3,457,544. The Well depth signal is in the form of recurring pulses whose repetition rate is related to the reeling speed of cable 6 from which the borehole investigating device is suspended. The intervals between pulses represent an incremental well depth which is selected sufficiently small to enable satisfactory resolution in the digital processing of the well logging data signals. In this embodiment the well depth pulses on line 14 recur at intervals corresponding to 1.25 cm of travel of the cable from which the sonde is suspended.

The well depth shifter 10 includes a multiplexer or commutator 16 which sequentially connects input data lines 12 to an analog to digital converter 18 under control by routing or multiplexing pulses on control lines 20 from a controller 22. The output of the analog to digital converter 18 is in the form of an output register (not shown) containing a digital data word of 14 bits with 12 bits representing data, one bit representative of the sign and a fourteenth bit being a parity bit.

The digital data words on output lines 24 from A/D converter 18 are respectively delivered in parallel to groups 26.1 to 26.8 of shift registers 28 for parallel transfer to shift register outputs 30. The parallel coupling of the input lines 24 to register groups 26 results in the advance of digital data words in a single group only because only one control line 20 is activated at any one time. Each digital data word is transferred to a group 26 of shift registers 28 under control by a shift control network 32. The output lines 30 from shift register groups 26 are applied to a data processor 34 which may include suitable digital to analog converters for simultaneous recording of the well logging data signals.

The depth shifting of the well logging data signals is obtained at the outputs 30 of the shift register groups 24 with the aid of the shift control networks 32. The latter networks relatively advance the digital words along their shift registers in correspondence with the occurrence of incremental well depth pulses on input line 14 or a known multiple thereof. The amount of relative advance is determined by shift control words derived in controller 22 and applied on lines 36 to the shift control networks 32 to achieve the desired depth matching at outputs 30. The shift control words may be fixed, i.e., hardwired or programmable with punch cards as described hereinafter in the preferred embodiment.

In the operation of well depth matcher 10, the well logging data signals on input lines 12 are periodically sampled in synchronization with the well depth pulses on line 14 or a multiple of the pulses. The lines 12 are sampled and converted to digital data words in sequence and after each conversion routed to an associated shift register group 26. At the time of a conversion, a shift control word associated with the data channel of that digital data word is applied to the appropriate shift control network to provide the desired relative advance of the digital data words.

The digital to analog conversion and advance of the digital data words along their respective shift registers occurs rapidly after a recurring well depth pulse. In this manner, the digital data words may be associated with particular incremental well depths and appropriately shifted in the shift registers to achieve a desired depth displacement.

The controller 22 is driven by well depth pulses on input line 14. The incremental well depth represented by the intervals between these pulses may correspond to an increment of 1.25 cm, which for some measurements is too high a resolution. The well depth pulses on line 14 can, therefore, be applied to a divider or counter network 38, which divides the input pulses by an appropriate number such as six so that well depth pulses corresponding to incremental well depths of 7.5 cm are applied on line 40 to a clock 42.

Clock 42 produces output pulses at a rate of 400 Hz on line 44 and has a pulse inhibiting input 46. The output pulses from clock 42 are applied to a binary pulse counter 48 capable of providing an output count corresponding to the number of different well logging input data lines 12 and a reset count. Thus, in the embodiment shown in FIG. 1 counter 48 has sufficient stages to provide eight distinctive counts for the input data lines 12 and a reset count when the input lines 12 have been sampled. The reset count condition of counter 48 causes an output which is coupled to input 46 of clock 42 to inhibit further pulses therefrom until the next 7.5 cm well depth pulse on line 40.

Counter 48 has its stages coupled through lines 49 to a pair of parallel decode networks 50, 52 which produce control signals corresponding to and identifying the various data lines 12. Decode network 50 produces control signals such as 54 on lines 20 to direct the multiplexer to connect an identified data line 12 to A/D converter 18. This routing function occurs with the leading edge 56 of signal 54.

Decode network 52 provides control signals on lines 58 representative of the count in counter 48 in a similar manner as decode network 50. Lines 58 are sequentially energized and applied to a reader 60. Reader 60 includes a machine readable record 62 such as a programmable punch card having a plurality of segments 64 assigned to identify processing data for individual well logging data lines 12.

Each segment 64 of a punch card 62 identifies a shift control word and a sampling rate control word. The sampling rate control word is applied on lines 56 to a logic network 66 to determine the frequency of sampling of a particular well logging data line 12. The shift control word appears on lines 36 for command of shift control networks 32 to control the relative positions of the digital data words in their shift registers 26. The output line 68 from logic network 66 is coupled to A/D converter 18 to provide a start conversion pulse. At the end of the conversion process A/D converter 18 delivers an end conversion pulse on line 70 to decode network 50 to reset the previously energized control line 20 and thereby produce the termination or a falling edge of signal pulse 54. To accomplish this function, decode circuits 50 can include an AND gate for each output line 20 with these AND gates enabled, via a flip-flop (which is reset by the next control pulse 54), by the end conversion signal on line 70.

In the event a sampling control word on lines 65 from reader 60 directs a sampling interval of 15 cm, i.e., one half the rate of well depth pulses 102, the start conversion pulse on line 68 is inhibited for one cycle by logic network 66. The latter network is provided with a suitable counter to recognize whether any such data line was sampled during preceding cycle.

The control lines 20 are also coupled to shift control networks 32 for respective identification and transfer of data from A/D converter 18 to the proper shift register group 26. Shift control networks 32 are alike and thus only network 32.2 is shown in detail. Control lines 20 are each coupled to a flip-flop 72 within the corresponding shift control network 32 whose output line 74 is energized when the control line 20 for the corresponding network 32 is deenergized by an end conversion pulse on line 70. Thus flip-flop 72 sets in response to the trailing edge 76 of control line pulse 54 as suggested by the waveform adjacent flip-flop 72.

Shift control network 32.2 is shown provided with a high speed generator 78 of about 200 KHz, though a single clock 78 may, if desired, be employed for all shift control networks 32. The output line 80 of clock 78 is coupled with output line 74 to an AND gate 82 to provide shift pulses on shift line 84.2 as long as AND gate 82 is enabled by flip-flop 72. The shift line 84.2 in turn is coupled to each of the shift registers 28 in group 26.2 for advance and transfer of digital data words from A/D converter 18. Note that only one shift line 84 is active at a time, thus assuring that the appropriate digital data word at the output of A/D converter 18 on lines 24 is transferred to the correspondingly appropriate shift register group 26.

The shift pulses on line 84.2 continue until flip-flop 72 is reset by a pulse on reset line 86 coupled to the output of an AND gate 88. The AND gate 88 is enabled by the output line 90 of a digital comparator 92 which compares the shift control word on lines 36 to the count developed in a counter 94 driven by the shift pulses on shift line 84.2. AND gate 88 is enabled by line 90 whenever comparator 92 recognizes a count in counter 94 that is equal to or greater than the number represented by the shift control word on lines 36.

The shift control words on lines 36 each represent a value $N - n$, where $N$ represents the number of stages in shift registers 28 for the associated data channel and $n$ represents the number of incremental well depth pulses that must be delivered by divider 38 from the instant a digital data word is introduced in parallel into its associated shift register group 26 until the instant this digital word reaches output 30 of shift registers 28. This number, $n$, can also be defined as the distance, expressed in units of intervals of, for example, 7.5 cm, 15 cm, etc. (depending upon the sample control word on lines 65), which must be traveled by the sonde before the digital data word of the associated data channel is delivered to processor 34.

In the operation of a shift control network 32 the flip-flop 72 is originally in the reset state which disables the AND shift gate 82, thus preventing shift pulses from clock 78 from being applied to shift registers 28. When, at the end of an analog to digital conversion flip-flop 72 receives an energizing waveform 76 on line 20.2, AND gate 82 is enabled and the 200 KHz pulses from clock 78 are applied to shift line 84.2. The shift pulses initially transfer the digital data word in the output register of A/D converter 18 in parallel to the inputs 96 of shift register group 26.2 controlled by shift line 84.2 and thereafter advance the digital data word at the speed of the pulses from clock 78 along the register in group 26.2.

The advance of the digital data word continues until the counter 94 has accumulated a count which is equal to the count represented by the shift control word set by the card in card reader 60. At this point, comparator 92 produces an active output which enables AND gate 88. The next clock pulse then resets flip-flop 72 to terminate further shifting of the digital data word along the shift register group 26.2. Since the A/D converter 18 has an active output during the entire enterval that shift line 84.2 is active in transferring data, each register 28 in group 26.2 is filled with identical bits to the extent of the number of pulses on shift line 84.2. This condition, however, does not impair the depth matching operation as will be further explained with reference to FIGS. 2A through 2H.

With the next energization of the control line 20.2 to multiplexer 16 for the sampling of data channel No. 2 A/D conversion flip-flop 72 is again placed into a "start-shifting" state. At this time the output of comparator 92 is still active since counter 94 contains a count which is equal or greater than the count represented by the shift control word applied to comparator 92. Hence, the next clock pulse on line 80 is permitted to pass through AND shift gate 82 as well as AND gate 88 to reset flip-flop 72 after the registers have shifted and counter 94 has been advanced by a single count. The digital data word is thus advanced by a single position along the group of shift registers. This single bit position advance continues until counter 94 again registers a count smaller than that represented by the shift control word, i.e., after counter 95 has returned to zero after having accumulated a maximum count.

In practice, counter 94 is sized to register a maximum count of N which is equal to the number of stages in shift registers 28. In such case the number of shift pulses on line 84.2 initially equals that amount which would allow comparator 92 to recognize (and activate line 90) the same count as the shift control word, i.e., $N - n$. Thereafter the digital data word is advanced at an interval of incremental depth pulses applied to line 40, i.e., equivalent to 7.5 cm of displacement, until n incremental advances have been made. After the $n^{th}$ control line 20.2 setting signal to flip-flop 72, counter 94 has attained its maximum capacity N and thereafter is recycled to zero with the next $(n + 1)^{th}$ start shift pulse on line 20.2. After this, a repeat sequence for shift control network 32 occurs identical to the sequence just described.

Figure 2:
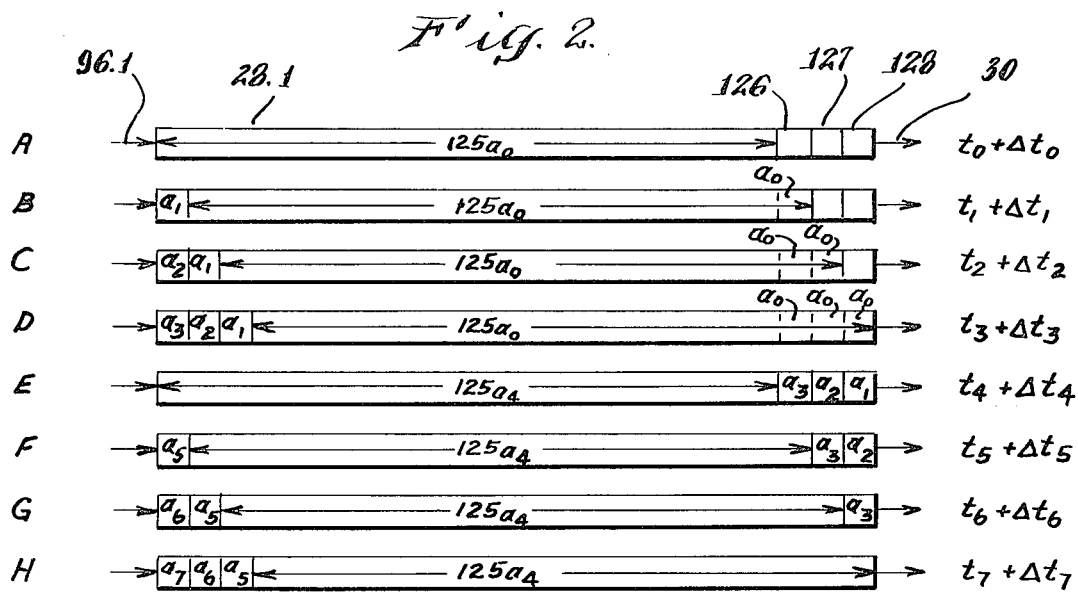
Figure 3:
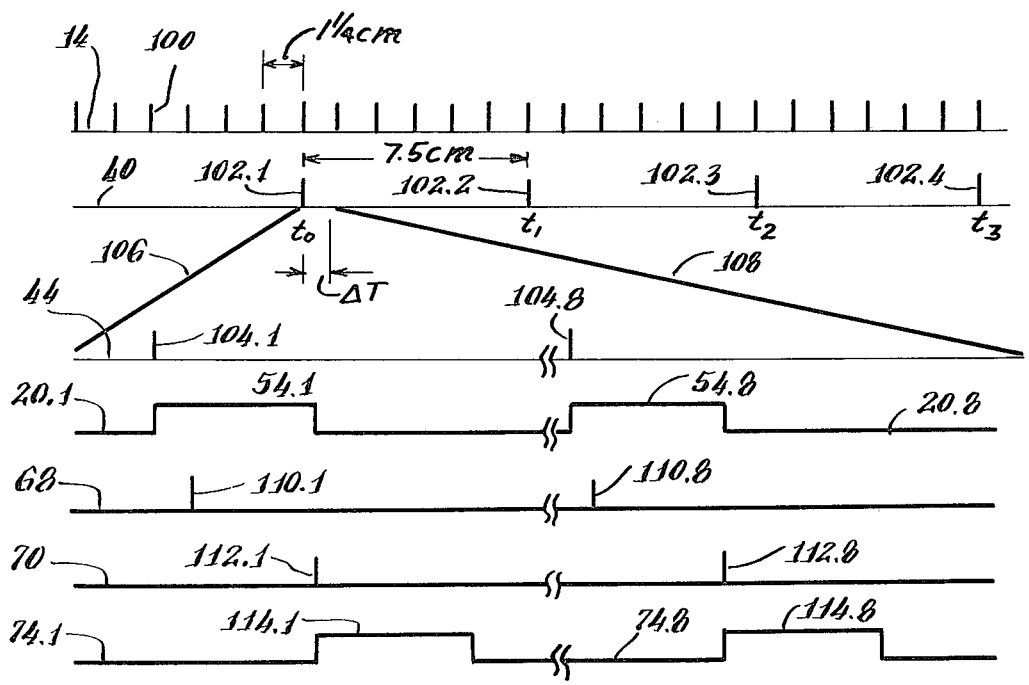

The advantage of the programmable shift control words and the shift control networks may be further appreciated with reference to the timing diagram of FIG. 3 and the shift register diagrams of FIGS. 2A through 2H.

FIG. 3 shows various waveforms, identified by the same numbers as on the lines on which the waveforms occur, as generated in apparatus 10. The well depth pulses 100 produced on line 14 correspond to 1.25 cm of travel of the sonde along a borehole. The division of the well depth pulses by divider 38 produces well depth pulses 102 separated on a time scale which is equivalent to 7.5 cm of travel by the sonde. The rate of occurrence of pulses 100 and 102 depends upon the reeling speed of the sonde and generally as described in the art is of the order of 30 cm per second (about 3,600 feet per hour).

Following each well depth pulse 102, clock 42 produces eight well depth pulses 104 on line 44 at a repetition rate of about 2,500 microseconds. Since between successive pulses 104 a data line 12 is multiplexed, converted to a digital data word and appropriately shifted in its shift register group, the time scale for the waveforms located below those for lines 14 and 40 has been expanded as suggested by the time expansion lines 106 and 108.

After well depth pulse 102.1, the first pulse 104.1 from clock 42 advances counter 48 by one, energizing both decoded control lines 20.1 and 58.1. The activation of line 20.1 generates a pulse 54.1 which routes the first input data line 12.1 into A/D converter 18. Activation of line 58.1 causes punch card 62 to be read with its segment 64.1 being decoded to produce a shift control word on lines 36 and a sample rate control word on lines 65. The sample rate control word is applied to logic network 66 whose output pulse 110.1 commences the A/D conversion. At the end of the A/D conversion, a pulse 112.1 is sent on line 70 to decode network 50 and effectively produce a start shifting command to the flip-flop 72 in the shift control network 32.1.

The enabling output pulse 114.1 on line 74 from flip-flop 72.1 may persist for as long as the maximum number of shift pulses as may be needed, i.e., N pulses for no depth delay or a single shift pulse for the maximum delay allowed by the shift register capacity. For example, if the shift registers 28 have 256 stages, 256 shift pulses at the rate of 200 KHz may be needed before the next data line 12.2 is to be processed. The duration of pulse 114.1 thus may be as long as about 1,270 microseconds or as short as one shift pulse, i.e., 5 microseconds.

All data lines 12 are processed in this manner following a well depth pulse 102. The total time $\Delta T$ (see FIG. 3) needed for each sequence of sampling all data lines 12 is kept as short as possible to effectively relate the digital data words generated from a common well depth pulse 102 to the same well depth.

Depth shifting of the digital data words is obtained by controlling the advance of the data within a shift register group 26. FIGS. 2A - 2H show the first bit shift register 28.1 in group 26.2 at various times during an operating cycle. The advance of this bit, a, is exemplary of that for other bits in other shift registers 28.2 through 28.14. In this example, shift registers 28 each have 128 stages, i.e. $N = 128$, and for purpose of illustration, assume that at time $t_o$, counter 94 in the associated shift control word on lines 36 includes a value of n equal to 3. Thus, three incremental well depth pulses 104 on line 44 will be needed to advance a digital data word to output 30.2 from the instant the digital data word is introduced in the shift register group 26.2.

At a time $t_o$, shift control network 32.2 will deliver $N - n$, or 125 shift pulses to line 84.2, thus placing the first bit $a_o$ after an instant $\Delta t_o$ in the first 125 stages as shown in FIG. 2A, because the output register of A/D converter 18 remains coupled to the register group 26 undergoing shifting by a shift line 84. The leading bit, however, is thus shifted by a predetermined initial advance equal to $N - n$ stages.

The next incremental well depth pulse 102.2 (see FIG. 3) occurs at time $t_1$ causing shift control network 32.2 to produce a first single shift pulse to introduce the next bit $a_1$ on the first stage of register 28.1 while transferring the front-most bit $a_o$ into stage 126 as shown in FIG. 2B at time $t_1 + \Delta t_1$.

In a similar manner, after the next incremental well depth pulse 102.3, (see FIG. 3) at time $t_2$, a second single shift pulse occurs, placing bits $a_2$, $a_1$ and $a_o$ in the stages as shown in FIG. 2C. A third single shift pulse places bits $a_3$, $a_2$, $a_1$ and $a_o$ in the shift register stages as shown in FIG. 2D after time $t_3 + \Delta t_3$. After the next incremental well depth pulse and third single shift pulse on line 84.2, the counter 94 in shift control network 32.2 has reached a maximum capacity.

The next or fourth shift pulse causes bit $a_o$ in the 128th stage to be shifted on output line 30.2 to processor 34 and cause counter 94 in shift control network 32.2 to return to a count of zero. At this time another group of 125 shift pulses are permitted since the comparator 92 recognizes that counter 94 represents a count smaller than that represented by the shift control word. Thus at time $t_4 + \Delta t_4$ the shift register includes 125 stages carrying bit $a_4$, while stages 126, 127 and 128 carry respectively bits $a_3$, $a_2$ and $a_1$ as shown in FIG. 2E. When thereafter, the cycle repeats and three single shift pulses occur, bits $a_1$, $a_2$, $a_3$ are shifted to processor 34 as shown in FIGS. 2F, 2G and 2H respectively. This described sequence is thereafter automatically repeated.

The effect of the shift control word is a delay in the output presentation of a digital data word by three incremental well depth pulses, or a total of $3 \times 7.5$ cm of well depth. The shift control word may be selected by changing the punch card 62 so that the delay can be varied over a well depth range depending upon the number of stages in shift registers 28.

The controlled delay of a digital data word with the punch card's recorded shift control words permits the depth matching of the various well logging data signals at input lines 12.1 through 12.8. For example, a pair of well logging data signals whose relative spacing on the sonde is equivalent to $x$ increments of 7.5 cm can be conveniently depth matched with the method and apparatus of this invention by selecting a shift control word for the leading well logging data signal equal to $N - x$.

When a data channel 12 is to be sampled at half the rate of another and they are spaced $x$ units of 7.5 cm from each other, the well depth matching process automatically takes the different sampling rate into account. In such case the channel with the lower sampling rate produces, for example, half the number of cycles in which the associated shift register is shifted. The digital data words in adjacent stages then represent a well depth increment of 15 cm.

In an example for a well depth shifter in accordance with the invention, assume an upwardly moving sonde with eight measuring tools, 1 through 8, spaced from top to bottom to respectively produce well logging signals on data lines 12.1 through 12.8. The relative spacing along the borehole is assumed as follows:

$a$ times 7.5 cm between tools 1 and 2
$b$ times 7.5 cm between tools 2 and 3
$c$ times 7.5 cm between tools 3 and 4
$d$ times 7.5 cm between tools 4 and 5
$e$ times 7.5 cm between tools 5 and 6
$f$ times 7.5 cm between tools 6 and 7
$g$ times 7.5 cm between tools 7 and 8.

Assuming that all channels are sampled every 7.5 cm and all shift registers have 128 stages, then the shift control words, $N - n$, for the respective digital data words are:

For tool 1, $128 - (a + b + c + d + e + f + g)$
For tool 2, $128 - (b + c + d + e + f + g)$
For tool 3, $128 - (c + d + e + f + g)$
For tool 4, $128 - (d + e + f + g)$
For tool 5, $128 - (e + f + g)$
For tool 6, $128 - (f + g)$
For tool 7, $128 - (g)$
For tool 8, 128.

The relative delay of the digital data words in the shift registers results in a well depth correlation of all data at outputs 30.

The embodiment shown in FIG. 1 is for the parallel transfer of well logging data in the register groups 26. One may, however, utilize serial transfer of well logging data. In such case a digital data word at the output of A/D converter 18 is moved in a series register in series coupled blocks of 14 bit stages for a 14bit data word or such other number of stages as demanded by the length of the digital data words. The transfer of the digital data words from one block to the next is obtained with groups of high frequency shift pulses applied to shift lines of the registers, with the number of pulses in such group determined by the number of bits in the digital data words.

The embodiment shown in FIG. 1 further is shown for a plurality of data lines. One may, however, depth shift digital data words with this invention for a single data channel and in a single serial register wherein the data words are moved in blocks as previously described.

While a specific embodiment of the invention has been shown and described, it will be understood by those skilled in the art that certain modifications and variations, both in form and detail, may be made without departing from the scope of the invention. For example, one may apply the end conversion line 70 from A/D converter 18 to a reset input of flip-flops 72 in shift control networks 32 rather than to decode network 50. In such case a single decode network 50 may be used to drive both the multiplexer 16 and the reader 60. Such modifications and variations are included within the scope of the following claims.

What is claimed is:

1. An apparatus for depth shifting well logging signals sampled in accordance with well depth signals recurring at intervals corresponding to a predetermined increment comprising means effectively actuated at the predetermined increment for producing control signals to select individual well logging signals referenced to different depths;

means responsive to the control signals for producing digital data words representative of the selected well logging signals at different well depths;

shift registers having inputs coupled to receive the digital data words, with each shift register being associated with a selected well logging signal and having a predetermined number of stages;

means for producing shift control words, each shift control word being determinative of the advance of a digital data word along its associated shift register; and means controlled by the associated shift control word for advancing each individual digital data word along its associated shift register for depth matching of the data words associated with the signals referenced to said different depths at the outputs of said shift registers.

2. The apparatus for shifting well logging signals as claimed in claim 1 wherein the means for producing shift control words includes a machine readable record carrying information formed of segments individually associated with a well logging signal for shift control thereof; and means for reading said record in synchronization with the control signals to provide said shift control words.

3. The apparatus for depth shifting well logging signals as claimed in claim 2 wherein each of said shift registers associated with a well logging signal is formed of a plurality of parallel shift registers forming a group for the parallel advancement of digital data words.

4. The apparatus for depth shifting well logging signals as claimed in claim 1 wherein the advancing means further includes means for producing shift pulses for advance of a digital data word in its associated group of shift registers;

shift pulse counting means having a maximum count equivalent to the number of sequential stages in the associated group of shift registers; and means for comparing an associated shift control word with the count in the shift pulse counting means for enabling said shift pulse producing means for a first predetermined number of shift pulses determined by the shift control word when the count is smaller than the shift control word and for enabling a second predetermined number of shift pulses when the count is equal to or greater than the shift control word.

5. An apparatus for depth shifting well logging signals with well depth signals recurring at intervals representative of a predetermined increment comprising means for producing digital data words effectively representative of the well logging signals at the time of the well depth signals;

groups of shift registers having inputs coupled to the digital data words and having outputs, with each group being associated with a well logging signal and each group including parallel operating shift registers having a predetermined number of stages and being selectively arranged to enable parallel advance of a digital data word;

means for producing shift control words individually associated with a well logging signal and representative of the advance of the digital data words in the groups of shift registers; and shift control networks each responsive to a shift control word and each shift control network being associated with a group of parallel shift registers to control the shifting advance of a digital data word therein.

6. The apparatus for depth shifting of well logging signals as claimed in claim 5 wherein the shift control word producing means produces shift control words, each of which represent the value $N - n$, where $N$ equals the number of stages in each shift register in a group with which the shift control word is associated and n represents an integer indicative of a desired number of well depth increments for delay of the associated digital data word to provide desired depth matching at the outputs of the groups of shift registers.

7. The apparatus for well depth matching of well logging signals as claimed in claim 6 wherein the shift control word producing means further includes a programmable machine readable record carrying control data grouped in segments which are individually associated with the groups of shift registers; and means for reading the machine readable record segments in synchronization with the production of the digital data words for producing the shift control words to control the shifting of the digital data words.

8. The apparatus for well depth matching of well logging signals as claimed in claim 7 wherein the programmable machine readable record further includes data segments representing sampling rate information for individual well logging signals; and means responsive to the signals representative of the sampling rate information for controlling the rate for the production of digital data words for respectively associated well logging signals.

9. The apparatus for well depth matching well logging signals as claimed in claim 7 wherein each shift control network further includes a counter for counting shift pulses;

a comparator for comparing the count in the counter and a count representative of the shift control word associated with the shift control network in which the counter and comparator are included; and means responsive to the output of the comparator for enabling a number of shift pulses corresponding to the number represented by the shift control word when the comparator senses a count in the counter less than the shift control word and for enabling single shift pulses in synchronization with the well depth signals when the counter registers a count equal or greater than the shift control word.

10. An apparatus for well depth matching different well logging signals originating from different locations on a sonde with recurring well depth pulses representative of operative sonde movements in a borehole comprising means for converting the different well logging signals to digital data words at intervals substantially referrable to the occurrence of a common well depth pulse;

means for producing shift control words in synchronization with the conversion of the different well logging signals, said shift control words being each representative of a desired delay of each digital data word produced in response to a well depth pulse;

digital data word shifting means having an input coupled to receive the digital data words and having an output towards which the digital data words are advanced; and shift control means responsive to each shift control word for controlling the arrival of digital data words at the output of the shifting means for a desired depth matching of the different well logging signals.

11. The apparatus for well depth matching well logging signals as claimed in claim 10 wherein the shifting means includes a predetermined number of stages between the input and the output and wherein the shift control word producing means produces shift pulses whose number is representative of $N - n$, where $N$ equals the number of stages between the input and output of the shifting means and n represents a number of shift pulses by which a digital data word is to be delayed relative to other digital data words generated in response to a common well depth pulse.

12. The apparatus for well depth matching well logging signals as claimed in claim 11 wherein the shifting means includes groups of shift registers having inputs coupled to digital data words and having outputs, with each group being associated with a well logging signal, each group including parallel operating shift registers having a predetermined number of stages and being arranged to enable parallel advance of a digital data word.

13. The apparatus for well depth matching of well logging signals as claimed in claim 11 wherein the shift control means includes means for rapidly shifting a digital data word within an interval between successive common well depth pulses to a desired depth shifted location in the shifting means with the desired depth shifted location being the $(N - n)$ stage in the shifting means;

means for advancing digital data words from the desired depth shifted location to the output of the shifting means at the speed of the recurring well depth pulses; and means for activating the rapidly shifting means when the previously rapidly advanced digital data word has been shifted to the output of the shifting means.

14. An apparatus for depth shifting a well logging signal generating with well depth signals recurring at intervals corresponding to a predetermined well depth increment comprising means for producing digital data words representative of the well logging signal at different well depths;

a shift register having an input and an output, the shift register having a predetermined number of stages and being arranged to enable advance of each digital data word to the output of the shift register;

means for producing a shift control word determinative of the effective placement of the digital data words in the shift register at a desired location corresponding with the desired depth shift of each digital data word;

means controlled by the shift control word for placing the digital data words at the desired location in the shift register and subsequently advancing the digital data words along the shift register at a predetermined shifting speed for depth shifting of the digital data words at the output of said shift register.

15. The apparatus for depth shifting of a well logging signal as claimed in claim 14 wherein the shift control word producing means produces a signal having a magnitude equal to $N - n$, where N is equal to the number of stages in the shift register and n is representative of the number of desired incremental well depth shifts, and wherein the means for placing of the digital data words advances the digital data words from the input of the shift register to a desired location which corresponds to the $N - n^{th}$ stage of the shift register.

16. The apparatus for depth shifting of a well logging signal as claimed in claim 15 wherein the means for placing of the digital data words further includes means responsive to the shift control word for generating $N - n$ shift pulses coupled to advance digital data words to the desired location in the shift register and means for producing n shift pulses upon placement of the digital data words at the desired location to advance digital data words to the output of the shift register.

17. The apparatus for depth shifting of a well logging signal as claimed in claim 14 wherein the means for placing of the digital data words further includes means for producing shift pulses for advance of digital data words along the shift register;

shift pulse counting means having a maximum count equivalent to the number of stages in the shift register; and means for comparing the shifting control word with the count in the shift pulse counting means for enabling said shift pulse producing means for a first predetermined number of shift pulses occurring at a high rate for rapid advance of a digital data word to the desired location in the shift register as determined by the shift control word and for enabling a second predetermined number of shifts occurring in correspondence with selected depth increments when the count is equal to or greater than the shift control word.

18. A method for depth shifting well logging signals from different well sensors located in spaced relationship on a borehole investigating device moved through a borehole with well depth pulses being produced to indicate incremental borehole advance made by the investigating device comprising the steps of forming groups of digital data words individually representative of the well logging signals substantially in synchronization with the well depth pulses;

reading a machine readable record in synchronization with the well depth pulses to identify shift control words individually associated with a digital data word in a group; and advancing the digital data words along shift registers under individual control of a shift control word to produce a desired well depth shift of the digital data words.

19. The method for depth shifting of well logging signals as claimed in claim 18 wherein the reading step includes the step of identifying shift control words having a magnitude represented by the relationship $N - n$, where N represents the number of stages in the shift registers where the advancement occurs and n represents the number of incremental borehole distances an associated digital data word is to be delayed to achieve the desired well depth shift.

20. The method for depth shifting of well logging signals as claimed in claim 19 wherein the advancing step further includes recyclically counting the number of shifts of digital data words with a maximum recycling count equal to N;

comparing the count of shifts with the count represented by the shift control words; and limiting the advance of the digital data words along the shift registers in accordance with the comparison step to establish the desired depth shift.

21. A method for depth shifting analog well logging signals from different well sensors in accordance with recurring well depth signals comprising the steps of individually identifying the well logging signals with each well depth signal;

sampling the identified well logging signals to form groups of digital data words individually representative of the value of a well logging signal at a substantially common sampling time;

storing the digital data words in respectively associated shift registers;

selecting shift control words representative of the advance of the digital data words in their respectively associated shift registers; and shifting the stored digital data words along their respective shift registers in accordance with the shift control words to present a desired depth shift of the digital data words at their respective shift register outputs.

22. The method of depth shifting well logging signals as claimed in claim 21 wherein the step of selecting shift control words further includes forming a machine readable record carrying machine readable data arranged to form shift control words individually associated with well logging signals for control over shift register advancement of the digital data words; and reading the machine readable record in synchronization with the well depth signals and applying a number of shift pulses determined by the shift control words to the shift registers for the shifting of the digital data words.

23. The method for depth shifting of well logging signals as claimed in claim 21 wherein the shifting step further includes rapidly shifting digital data words to a predetermined depth shifted location in their associated shift registers during respectively related intervals between successive sampling, following by shifting of subsequent digital data at a slower rate determined by the rate of the recurring well depth signals until the digital data words from the predetermined depth shifted location have been shifted to the shift registers' outputs; and repeating said rapid and slow shifting of the well logging digital data words to provide desired depth matching of digital data words at the outputs of the shift registers.

24. The method of depth shifting of well logging signals as claimed in claim 22 wherein the machine readable record forming step further includes providing the machine readable record with sampling control words associated with each well logging signal for respective control of its sampling rate, and wherein the reading step includes the step of reading the sampling control words from the machine readable record to correspondingly vary the sampling rate of the well logging signals.

25. A method for depth shifting different well logging signals in accordance with well depth signals which recur at intervals corresponding with predetermined well depth increments comprising the steps of forming a machine readable record carrying data representative of desired relative depth positions of the well logging signals at said incremental well depths;

reading the machine readable record in synchronization with the well depth signals to generate desired depth position control signals respectively associated with the different well logging signals;

adjusting the relative positions of the different well logging signals in accordance with the position control signals for well depth alignments thereof; and recording the aligned well logging signals to form a depth matched well logging record for well analysis.

26. A method for investigating earth formations adjoining a borehole comprising the steps of advancing a borehole investigating device through a borehole while deriving well logging signals representative of a characteristic of the earth formations adjoining the borehole;

generating incremental depth pulses as a function of the advance of the borehole investigating device through the borehole;

forming digital data words of the well logging signals in correspondence with the incremental depth pulses;

placing the digital data words at a desired location in a shift register with the location being selected commensurate with a desired depth shift; and advancing the digital data words from the desired location along the shift register in correspondence with incremental depth pulses to provide depth shifted digital data words at the output of the register for the depth matched investigation of earth formations adjoining the borehole.

27. The method of investigating earth formations as claimed in claim 26 wherein the placing step further includes forming a shift control word representative of the desired depth shift of the digital data words with the shift control word being determinative of the desired location of the digital data words in the shift register.

28. The method of investigating earth formations as claimed in claim 27 wherein the shift control word forming step further includes reading a machine readable record in synchronization with the incremental depth pulses to identify the shift control word.

29. The method of investigating earth formations as claimed in claim 27 wherein the placing step further includes rapidly advancing a digital data word produced during an incremental depth pulse from the input of the register to the desired location, and thereafter.

shifting the rapidly advanced digital data word at the recurring speed of the incremental depth pulses to the output of the shift register.

30. An apparatus for depth shifting well logging signals with incremental depth pulses comprising means for producing digital data words representative of the well logging data signals at incremental depths;

a shift register having an input and an output with the input coupled to receive the digital data words for their advancement;

means actuated by incremental depth pulses for producing a shift control word representative of the depth shift desired for the digital data words;

means responsive to the shift control word and operative during an interval between successive incremental depth pulses for rapidly advancing digital data words to a desired depth shifted location in the shift register as determined by the shift control word;

means for shifting digital data words from the desired depth shifted location to the shift register output at a shifting speed determined by the recurrence of incremental depth pulses; and means for activating the means for rapid advancement of digital data words when the digital data word previously at the desired depth shifted location is shifted to the output of the shift register.

31. The apparatus for depth shifting a well logging signal as claimed in claim 30 wherein the shift control word is equal to $N - n$, where N equals the number of stages in the shift register and $n$ represents the number of incremental depth pulses needed to shift a digital data word from the desired depth shifted location to the output of the shift register.

32. An apparatus for delaying samples of a well logging signal comprising means for sequentially sampling a well logging signal;

shift register means having an input and an output and having a predetermined storage capacity in excess of a predetermined number of samples of the well logging signal for producing delayed samples at the output;

means for entering said predetermined number of samples at the input of the shift register means;

first means for generating first shift pulses corresponding in number to the excess storage capacity of said shift register means and coupling said first shift pulses to the shift register means to shift the predetermined number of samples; and second means independent of the first means for generating second shift pulses corresponding in number to the predetermined number of samples and coupling the second shift pulses to the shift register means to provide a delayed sequence of samples at the output of said shift register means.

33. The apparatus of claim 32 wherein said second means generates said second shift pulses at the same rate as the rate with which samples are entered in the shift register means.

34. The apparatus of claim 33 wherein said first means generates said first shift pulses at a rate which is substantially higher than said second shift pulses.

35. The apparatus of claim 34 wherein said first shift pulses are generated while entering the same sample to thereby enter a plurality of copies of said same sample into said shift register means, and wherein each of said second shift pulses is further coupled to enter a new sample into said shift register means while shifting samples along the shift register means.

36. The apparatus of claim 35 wherein said first means further includes means producing a shift control word determinative of the number of first shift pulses.

37. The apparatus of claim 32 wherein said first means further includes means for producing said first shift pulses once initially and each time after the predetermined number of samples have been entered into said shift register means.

38. The apparatus of claim 37 wherein said first shift pulses are produced as a group of high speed pulses which occur each time the predetermined number of samples have been entered into the shift register means.

39. An apparatus for delaying sequences of samples of a well logging signal comprising
means for sequentially sampling a well logging signal;
shift register means having an input and an output and having a predetermined storage capacity for producing delayed samples at the output;
means for entering said samples at the input of the shift register means; and
means for generating first and second shift pulses coupled to shift the samples in the shift register means to its output, said first shift pulses being selected commensurate with a desired placement of samples in the shift register means in correspondence with the desired delay of the samples, and said second shift pulses being selected to deliver the samples from their desired placement to the output of the shift register means.

40. The apparatus as claimed in claim 39 wherein the first shift pulses are generated at a rate which is substantially higher than the rate for the second shift pulses.

41. The apparatus as claimed in claim 40 wherein the rate for the first shift pulses is selected sufficiently high to complete the desired placement of the samples before a new sample of the well logging signal is produced.

42. The apparatus of claim 41 wherein said means for generating first and second shift pulses further includes means for producing a shift control word determinative of the number of first shift pulses.

43. An apparatus for delaying samples of a well logging signal comprising
means for sequentially sampling a well logging signal;
shift register means for advancing samples of the well logging signal to an output;
means for placing the well logging samples at a desired location in the shift register means, wherein the desired location corresponds with a predetermined delay for the samples; and
means for producing pulses coupled to advance the samples from the desired location to the output of the shift register means and generate said delayed well logging signal samples at the shift register means output.

44. The apparatus as claimed in claim 43 wherein the means for placing of the well logging samples further includes
means for producing a shift control word representative of the desired location of the samples in the shift register means; and
means responsive to the shift control word for producing a corresponding number of shift pulses coupled to the shift register means, said shift pulses being selected in number to shift each well logging sample from an input of the shift register means to the desired location.

45. A method for delaying a well logging signal comprising the steps of
sampling the well logging signal at a predetermined rate;
entering the samples in a shift register having a predetermined number of stages;
advancing the samples to a location in the shift register corresponding to a desired delay of the samples; and
shifting the samples from their desired delay location to the output of the shift register at a speed selected to provide the desired delayed sampled well logging signal at the output of the shift register.

46. The method for delaying a well logging signal as claimed in claim 45 wherein the advancing step further includes the step of
rapidly shifting the samples to their respective desired delay locations in the shift register during a time period which is less than the sampling rate.

47. A method for delaying samples of a well logging signal comprising the steps of
sampling the well logging signal at a predetermined rate;
entering a predetermined number of samples in a shift register having a predetermined storage capacity in excess of the predetermined number of samples;
first shifting the samples at a first rate along the shift register for a number of shifts corresponding to the excess capacity of the shift register; and
second shifting the samples at a second rate along the shift register for a number of shifts corresponding in number to the predetermined number of samples.

48. The method of delaying samples of a well logging signal as claimed in claim 47 wherein the second shifting step occurs at a rate which is the same as the rate of entering the samples into the shift register.

49. The method of delaying samples of a well logging signal as claimed in claim 48 wherein the first shifting step occurs at a rate which is sufficiently high to enable completion during a time period which is less than the sampling rate.

50. The method for delaying samples of a well logging signal as claimed in claim 47 wherein the first shifting step occurs once initially and each time thereafter following the step of entering a predetermined number of samples.

* * * * *